United States Patent
Vekkeli

(10) Patent No.: US 12,185,741 B2
(45) Date of Patent: Jan. 7, 2025

(54) METHOD OF PRODUCING A FOOD PRODUCT

(71) Applicant: NE Innovations Oy, Helsinki (FI)

(72) Inventor: Santtu Vekkeli, Helsinki (FI)

(73) Assignee: NE INNOVATIONS OY, Helsinki (FI)

(*) Notice: Subject to any disclaimer, the term of this patent is extended or adjusted under 35 U.S.C. 154(b) by 0 days.

(21) Appl. No.: 17/993,496

(22) Filed: Nov. 23, 2022

(65) Prior Publication Data

US 2023/0157332 A1   May 25, 2023

(30) Foreign Application Priority Data

Nov. 25, 2021 (FI) ........................................ 20216206
May 5, 2022 (FI) ........................................ 20225390

(51) Int. Cl.
| | |
|---|---|
| *A23L 13/50* | (2016.01) |
| *A23J 3/16* | (2006.01) |
| *A23L 7/10* | (2016.01) |
| *B02C 18/30* | (2006.01) |

(52) U.S. Cl.
CPC ............ *A23L 13/55* (2016.08); *A23J 3/16* (2013.01); *A23L 7/10* (2016.08); *B02C 18/30* (2013.01)

(58) Field of Classification Search
CPC .... A23L 13/55; A23L 7/10; A23J 3/16; B02C 18/30
USPC ........................................................ 426/644
See application file for complete search history.

(56) References Cited

U.S. PATENT DOCUMENTS

| | | | |
|---|---|---|---|
| 2,622,028 A | 12/1952 | Torr | |
| 3,739,994 A | 6/1973 | McFarland | |
| 4,022,915 A * | 5/1977 | Zukerman | ............. A23K 40/30 |
| | | | 426/805 |
| 5,853,790 A | 12/1998 | Glancy | |
| 5,922,692 A | 7/1999 | Marino | |
| 2001/0053405 A1 | 12/2001 | Cheuk et al. | |
| 2008/0268115 A1 | 10/2008 | Kang et al. | |
| 2012/0237642 A1 | 9/2012 | Gardewin | |
| 2014/0087044 A1 | 3/2014 | Wenger et al. | |
| 2020/0268020 A1 * | 8/2020 | Rokey | .................. A23N 17/002 |

FOREIGN PATENT DOCUMENTS

| | | |
|---|---|---|
| EP | 2 011 404 | 1/2009 |
| JP | 48-35469 | 10/1973 |
| RU | 2 223 673 | 2/2004 |
| RU | 2 486 759 | 7/2013 |
| WO | 2005/039309 | 5/2005 |
| WO | 2009/003721 | 1/2009 |

OTHER PUBLICATIONS

Search Report for FI Application No. 20225390 dated Aug. 18, 2022, 2 pages.
Search Report for FI Application No. 20216206 dated Mar. 25, 2022, 2 pages.

(Continued)

*Primary Examiner* — Brent T O'Hern
(74) *Attorney, Agent, or Firm* — Nixon & Vanderhye PC

(57) ABSTRACT

It is disclosed a method of producing a food product for human consumption by using extrusion from a plant-based food material and gutted and plucked poultry comprising bones, hard tissues, tendons, skin and/or cartilages.

13 Claims, 3 Drawing Sheets

(56) References Cited

OTHER PUBLICATIONS

Aug. 8, 2023 Office Action issued in Taiwanese Patent Application No. 111145024, pp. 1-9 [machine translation included].
Sözen et al., "Potential Risks of Mechanically Separated Poultry Meat Technology," Akademik G1da / Academic Food Journal; ISSN Print: 1304-7582, Online: 2146-9377; Akademik G1da 11(1) (2013) pp. 59-63.

\* cited by examiner

METHOD OF PRODUCING A FOOD PRODUCT

CROSS-REFERENCE TO RELATED APPLICATIONS

This application claims priorities to FI Patent Application No. 20225390 filed May 5, 2022, and FI Patent Application No. 20216206 filed Nov. 25, 2021, the entire contents of which are hereby incorporated by reference.

FIELD OF THE INVENTION

The present invention relates to a method of producing a food product. More particularly, the invention relates to a method of producing a food product by extrusion from poultry including undervalued parts of poultry.

BACKGROUND OF THE INVENTION

Extrusion is widely used in the manufacture of various food products. Broadly, extrusion is a continuous process which uses an extruder having one or two screws. The extruder provides transport, compression, mixing, cooking, shearing, heating, cooling and shaping of raw material to final products.

U.S. Pat. No. 5,853,790 discloses a method for commercial preparation of poultry meat for human consumption by using extrusion. The method effectively maximizes the use of poultry meat from an entire poultry carcass, and enhances the value of all of the meat from a bird carcass. The meat portions of whole birds are deboned in the method.

US 2012/0237642 A1 discloses a method for production of a meat-based, cereal-free semi-moist animal food product by extrusion. Meat may be poultry.

US 2008/0268115 A1 discloses a process for processing poultry wherein a hot boned poultry meat is provided, ground or macerated and blended with salt. The term "hot boned poultry meat" refers poultry meat that is deboned.

US 2014/0087044 A1 discloses a method of preparing a food or feed ingredient for incorporation into a human food or animal feed by extrusion. Deboned meat, e.g., from poultry, is used in the method.

RU 2223673 discloses a method for producing combined extrusion products from meat and vegetable raw materials. Poultry meat used in the method is mechanically deboned. Veins, tendons and skin may be used in the production.

BRIEF DESCRIPTION OF THE INVENTION

It has now been found that a food product for human consumption with satisfactory organoleptic properties, such as appealing taste and good mouthfeel, may be produced from poultry meat material and a plant-based food material by effectively using whole bird except gut and feathers. Undervalued parts of birds, and poultry meat from an entire poultry carcass may be effectively used including bones, hard tissues, tendons, skin and/or cartilages. Thus, poultry meat from an entire poultry carcass is effectively converted to a valuable food product with consumer acceptable organoleptic properties.

The invention provides a sustainable method in which whole gutted and plucked bird is effectively used in the production of a ready-to-consume food product for human consumption providing environmental benefits.

The invention also provides a method in which undervalued parts of a bird or of low hygienic quality may be used providing economic benefits in that the product can be offered at a lower cost.

The invention further provides a method of producing a food product with an increased nutritional value.

Further, the invention provides a method of producing a food product which enables reduction of global meat production providing environmental benefits.

The invention also provides a method of producing a food product with high microbiological quality and substantially eliminated *Salmonella* bacteria.

The food product can be used as an ingredient or an extender and combined with other food materials to produce a wide variety of food compositions.

The food product produced by the method of the invention is also suitable as an animal feed.

In an aspect, the present invention provides a method for producing a food product from a plant-based food material and poultry meat material including undervalued parts of poultry.

In another aspect, the invention provides a food product comprising gutted and plucked poultry meat material comprising bones, wherein the calcium content of the food product is in the range of about 0.2 wt-% to about 2.0 wt-%.

In a further aspect, the invention provides a food composition comprising a food product of the invention or a food product produced by the method of the invention.

In an aspect, the invention provides use of a food product of the invention or a food product produced by the method of the invention in the food compositions.

In further aspect, the invention provides an apparatus comprising means for implementing the method of the invention.

DETAILED DESCRIPTION OF THE INVENTION

In an aspect, the present invention provides a method of producing a food product, comprising
  providing gutted and plucked poultry meat material comprising bones, hard tissues, tendons, skin and/or cartilages,
  providing a plant-based food material,
  grinding the gutted and plucked poultry meat material with a grinder having a particle size of at most 5 mm to provide ground poultry mass,
  adding the plant-based food material to the ground poultry mass to provide a mixture of the ground poultry mass and the plant-based food material,
  subjecting the mixture to an extrusion provide an extruded mass as a food product.

Figure 1:
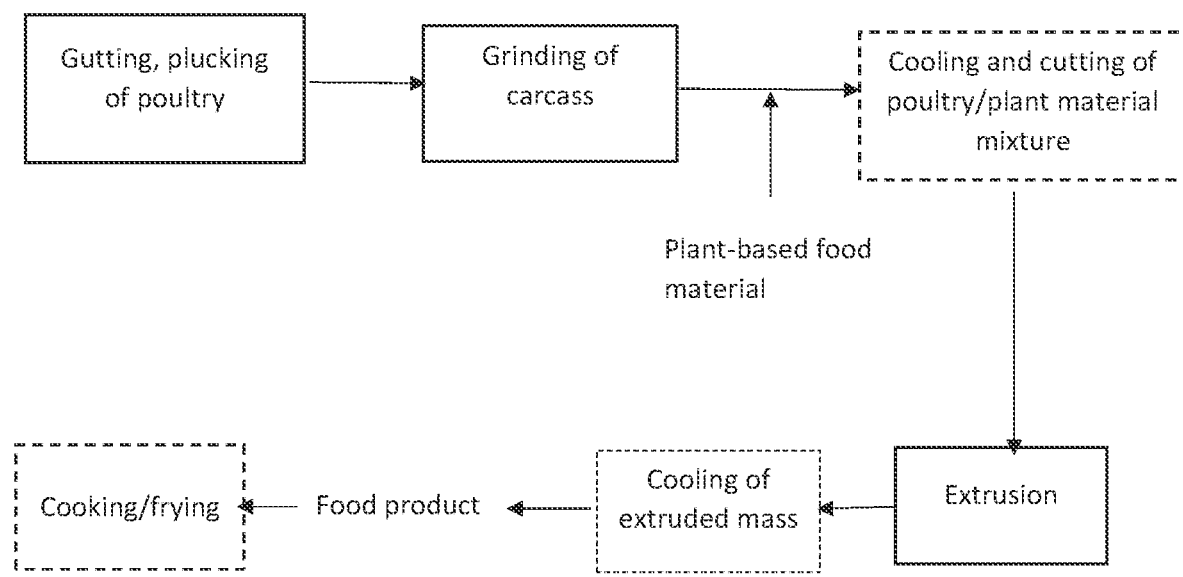
FIG. 1 generally illustrates a process flow diagram of an embodiment of the method of the invention.
Figure 2:
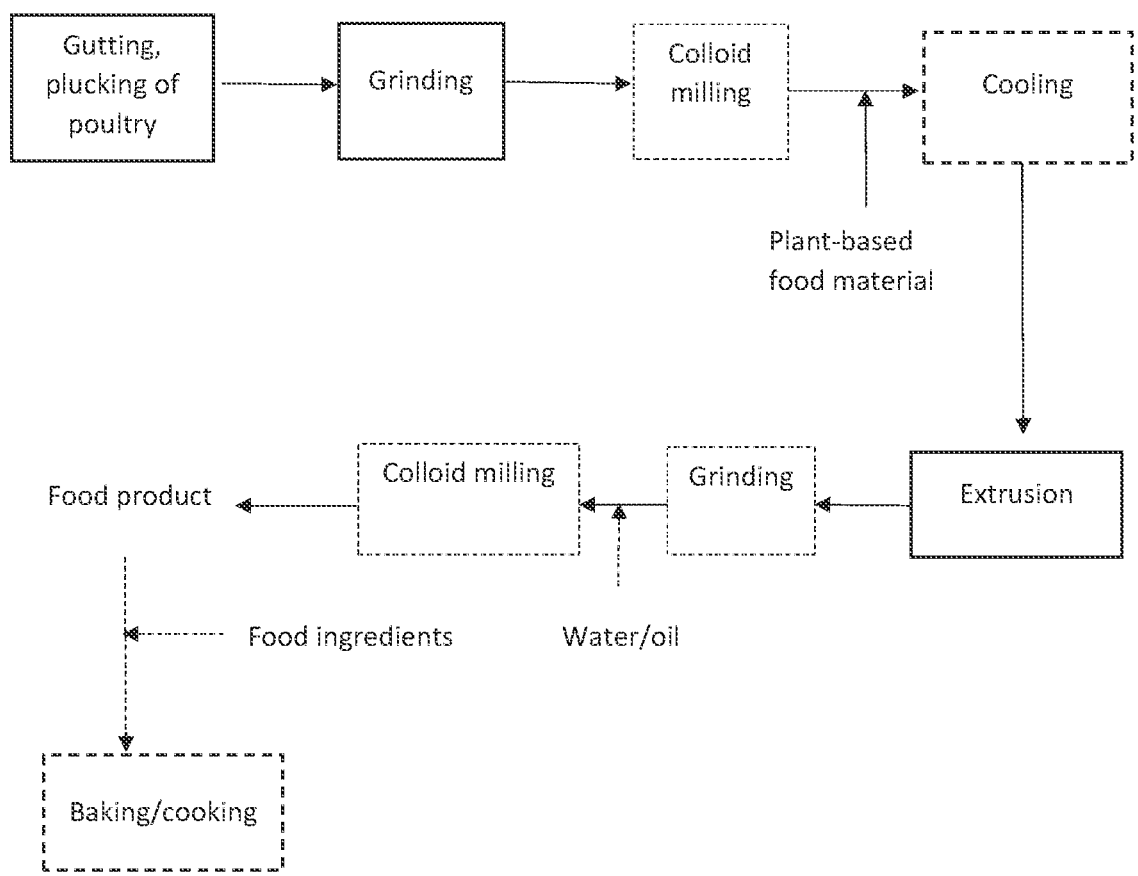
FIG. 2 generally illustrates a process flow diagram of another embodiment of the method of the invention.

FIG. 1 illustrates an embodiment of the method of the invention. FIG. 2 illustrates another embodiment of the method of the invention. The dotted line in FIGS. 1 and 2 illustrates optional method steps. The methods may include further optional method steps not shown in the figures.

Poultry meat material suitable for use in the method of the invention includes, but is not limited to, chickens, turkeys, ducks, and geese. In an embodiment of the invention, poultry meat material is chicken.

In an embodiment, the gutted and plucked poultry meat material comprises bones, hard tissues, tendons, skin and/or cartilages. In an embodiment, the gutted and plucked poultry meat material comprises at least bones. In an embodiment, the gutted and plucked poultry meat material comprising bones, hard tissues, tendons, skin and/or cartilages, are originated from legs, necks, skin and/or heads of poultry.

The content of the bones in the gutted and plucked poultry meat material may vary in the range of about 10 wt-% to about 60 wt-%. Use of increased amount of bones in the gutted and plucked poultry meat material beneficially results in an increased amount of calcium in the final food product.

The gutted and plucked poultry meat material is ground to crush bones and other hard tissues and to provide a ground poultry mass which is in a suitable form to be fed to an extrusion. The grinding is carried out with a grinder having a hole size of at most 5 mm. In an embodiment, the grinder is a meat grinder having a hole size in the range of about 2 mm to about 5 mm.

In an embodiment, the ground poultry mass is subjected to a colloid mill to further crush bone particles to smaller pieces. Generally, "colloid mill" is a machine which has a high-speed rotor and a stator providing superfine grinding results along with simultaneous emulsifying, homogenizing, and dispersing. The rotor pushes the material into small gaps between the rotor and stator causing intense mechanical shear. In the present invention, colloid milling provides a homogenous, ultra-fine bone particles of bone-containing poultry mass and beneficially enhances softening of bone particles in the subsequent extrusion. In an embodiment, colloid milling of the ground poultry mass provides bone particles having an average particle size of at most 500 μm.

After grinding with a grinder, and optional further grinding with a colloid mill, the obtained ground poultry mass is mixed with a plant-based food material. Any food-grade plant-based food material is suitable to be added to the ground poultry mass. The plant-based food material includes, but is not limited to, a food material which is rich in protein, carbohydrate and/or fibre. In an embodiment, the plant-based food material comprises soy protein, pea protein, cereal proteins, broad bean protein, maize protein, potato starch, maize starch, or any mixture thereof. In an embodiment, the plant-based food material is provided as finely ground powder. In an embodiment, the plant-based food material is thoroughly mixed with the ground poultry mass to provide a uniform mixture of the ground poultry mass and the plant-based food material.

In an embodiment, the mixture of the ground poultry mass and the plant-based food material is ground again, e.g., with a meat grinder with a hole size of about 5 mm, to provide a ground mixture exhibiting a thread-like structure.

The plant-based food material is added to the ground poultry mass in an amount so as to provide a food product containing about 5 wt-% to about 90 wt-% of the plant-based food material. In an embodiment, the amount of the plant-based food material is in the range of about 5 wt-% to about 50 wt-%. In another embodiment, the amount is in the range of about 40 wt-% to about 75 wt-%. In a further embodiment, the amount is in the range of about 40 wt-% to about 50 wt %. In a still further embodiment, the food product contains about 10 wt-% to about 30 wt-% of the plant-based food material.

In an embodiment, the food product contains about 10 wt-% to about 95 wt-% of the gutted and plucked poultry meat material or the ground poultry material. In another embodiment, the food product contains about 50 wt-% to about 95 wt-% of the gutted and plucked poultry meat material or the ground poultry material. In a further embodiment, the amount is in the range of about 25 wt-% to about 60 wt-% of the food product. In a further embodiment, the amount is in the range of about 50 wt-% to about 60 wt-%. In a still further embodiment, the food product contains about 70 wt-% to about 90 wt-% of the gutted and plucked poultry meat material or the ground poultry material.

In an embodiment, the ground poultry mass is cut to pieces having a diameter of about 0.5 to about 15 mm, e.g., about 2 mm, before the pieces are fed to the extrusion.

In an embodiment, compressed air is used to facilitate feeding of the ground poultry mass to an extruder and to avoid clogging of the extrusion nozzles. In an embodiment, the ground poultry mass is cooled to a temperature of about −25° C. to about 6° C. Cooling of the mass facilitates the feeding of the mass to an extruder. Further, cooling provides structural strength to the mass, while formation of a gel-like structure is avoided. Cooling of the mixture of the ground poultry mass and the plant-based food material also improves microbiological quality of the mass mixture before feeding it to the extrusion process.

The mixture of the ground poultry mass and the plant-based food material is subjected to an extrusion to provide an extruded mass. In an embodiment, the extrusion is performed at a moisture of at least 20%. In an embodiment, the extrusion is a wet extrusion to provide an extruded mass. In context of the present invention, the term "wet extrusion" means that the mixture of the ground poultry mass and the plant-based food material to be extruded has a moisture content of at least 30%. In an embodiment, the moisture content of the mixture of the ground poultry mass and the plant-based food material is in the range of 30% to about 70%. If the moisture content is lower than 30%, it may be difficult to carry out the extrusion process, since the mixture in the extruder is dry. On the other hand, if the moisture content is higher than 70%, liquid is undesirably separated from the dry matter of the mixture.

The extrusion may be carried out with a single-screw or twin-screw extruder. Shearing and tearing combined with moisture in the extrusion step causes softening of the hard tissues of poultry and provides a unique structure to the final food product.

In an embodiment, the extrusion, such as wet extrusion, is performed at a temperature of about 100° C. to about 400° C. Depending on the extruder used in the method, the extruder has to contain at least one heating segment where the temperature is at least 100° C. In addition, there may be further heating segments where the extrusion may be performed below 100° C., e.g., at 70° C. In an embodiment of the invention, an extruder is used which contains several heating segments each operated at a different temperature. In an embodiment, the temperature of the heating segments increases when the mass moves forward in the extruder.

The duration of the extrusion step is dependent on the apparatus construction and settings.

In an embodiment, the extrusion is performed using about 100 rpm to about 1000 rpm speed. In another embodiment, the extrusion is performed using about 200 rpm to about 600 rpm speed. In an embodiment, about 500 rpm is employed in the extrusion.

In an embodiment, the wet extrusion is performed using about 100 rpm to about 1000 rpm speed. In another embodiment, the wet extrusion is performed using about 170 rpm to about 600 rpm speed. In an embodiment, about 170 rpm is employed in the wet extrusion.

In an embodiment, the extrusion of the ground poultry mass provides an extruded mass having a temperature of at least 100° C.

In an embodiment, the extruded mass is cooled to a temperature of about +60° C. to about −30° C. In an embodiment, cooling of the extruded mass is performed in an extruder before the extruded mass is discharged from the extruder. Cooling in the extruder is conveniently carried out in the cooling die. When the extruded mass is cooled in the extruder, the temperature of the mass discharged from the extruder may range from about 1° C. to about 80° C., or from about 1° C. to about 60° C. In an embodiment, the temperature of the extruded mass is in the range from about 30° C. to about 60° C.

In another embodiment of the invention, the ground poultry mass in the extruder is pressed thorough a hole, which may be smaller than or equal to the cylinder area in the end of the extrusion cylinder. Extruded mass loses a portion of water steam when it exits the process, if the temperature is more than 100° C. The mass has a different taste, smell, structure (viscosity, cutting properties etc.), and it reacts differently in post-processing compared with a process involving a cooling die step.

The extrusion provides an extruded mass as a food-grade product with which is ready to be consumed as such.

In an embodiment, the extruded mass is further minced with a colloid mill to improve the sensory properties of the obtained food product. The colloid mill at this stage may be the same as or different from the colloid mill used for grinding the ground poultry mass. In an embodiment, water and/or oil is added to the extruded mass before colloid milling to enhance the performance of colloid milling. Grinding of the extruded mass with a colloid mill provides a food product containing bones with an average particle size of about 1 μm to about 500 μm. The colloid milled food product exhibits a smooth mouth feel without observable bone particles present.

The colloid milling of the extruded mass provides a food-grade product with appealing sensory properties which is ready to be consumed as such.

Extrusion process decreases microbial load of poultry carcass enabling use of poultry of low hygienic quality. Microbial load is reduced by approximately $1000-10^{12}$ fold during the process.

The extruded food product produced by the method of the invention may imitate the texture, flavour, and mouthfeel of meat.

The method of the invention provides a food product which exhibits an increased nutritional value. By using calcium-containing parts of poultry, i.e., bones, hard tissues, tendons, and/or cartilages, the calcium content of the food product produced by the method is increased compared with typical poultry meat products. In an embodiment, the food product has a calcium content of about 0.2 wt-% to about 2.0 wt-%. In another embodiment, the calcium content of the food product is about 0.2 wt-% to about 1.2 wt-%. In a further embodiment, the calcium content of the food product is about 0.2 wt-% to about 0.7 wt-%. In a still further embodiment, the calcium content of the food product is about 0.2 wt-% to about 0.5 wt-%. In an embodiment, the calcium content of the food product is about 0.5 wt-% to about 0.7 wt-%. In an embodiment, the calcium content is about 0.52 wt-%.

In an embodiment, the extruded and optionally colloid milled food product is heat-treated at a temperature ranging from about 110° C. to about 400° C. to further improve sensory properties and mouthfeel of the product. The heat treatment may be carried out, e.g., by cooking in oil, e.g., at 150-300° C., grilling, pan frying, drying by heat, e.g., at 200-400° C., freeze drying below −70° C., microwaving or infrared radiating.

Extrusion of a poultry meat material with undervalued parts, such as bones and other hard tissues, together with heat treatment provides a ready-to-eat food product for human consumption which shows unique, appealing taste and structure, and mouthfeel.

The sensory properties of the food product may be further improved by adding ingredients typically used in food manufacture to the food product produced by the method of the invention, e.g., flavouring agents, aromas, salt, stabilizers, emulsifiers, carbohydrates, fibres, oils and fats, etc.

In an aspect, the invention provides a food product comprising gutted and plucked poultry meat material comprising bones, wherein the calcium content of the food product is in the range of about 0.2 wt-% to about 2.0 wt-%. In an embodiment, the calcium content of the food product is about 0.2 wt-% to about 1.2 wt-%. In a further embodiment, the calcium content of the food product is about 0.2 wt-% to about 0.7 wt-%. In a still further embodiment, the calcium content of the food product is about 0.2 wt-% to about 0.5 wt-%. In an embodiment, the calcium content of the food product is about 0.5 wt-% to about 0.7 wt-%. In an embodiment, the calcium content is about 0.52 wt-%.

The extruded food product may be combined with other food materials to provide a wide variety of food compositions having different appearance, taste and structure. Thus, in an aspect, the invention provides use of a food product produced by the method of the invention or the food product of the invention as an ingredient or extender in the production of food compositions. The food product may be combined, for example, with a plant-based food raw material or poultry meat material without bones, hard tissues, tendons, skin and/or cartilages. The food product produced by the method of the invention or the food product of the invention may be included in the foodstuff in an amount up to about 50 wt-% without imparting any negative effect on the sensory properties of the food composition.

In another aspect, the invention provides a food composition comprising a food product produced by the method of the invention or the food product of the invention.

Figure 3:
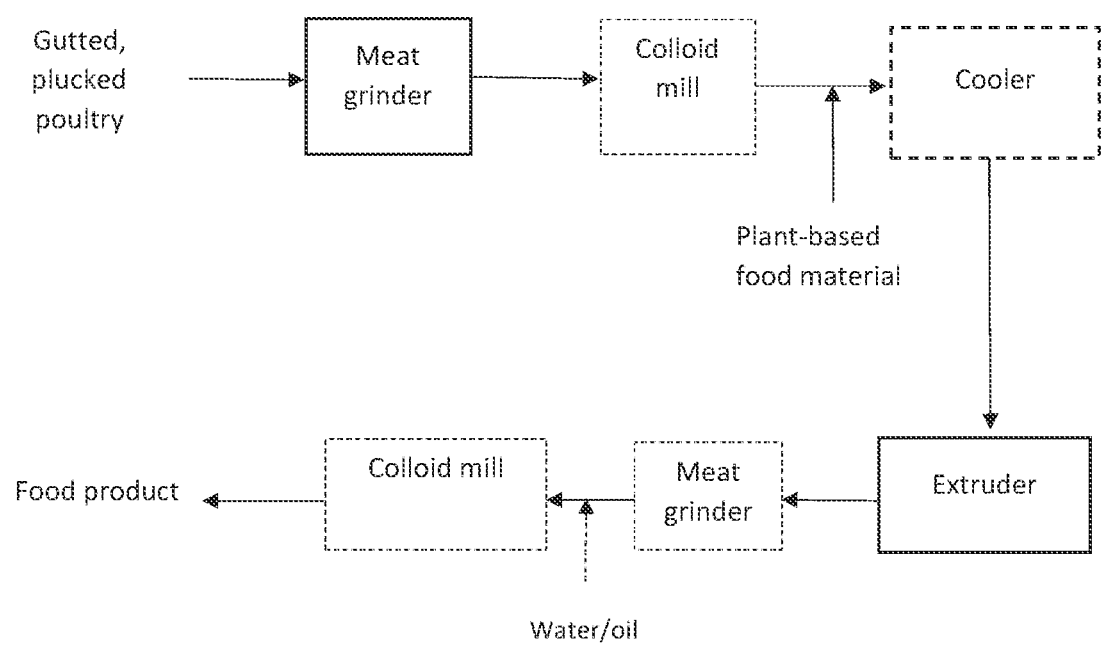
FIG. 3 illustrates an embodiment of an apparatus of the invention.

In a further aspect, the invention provides an apparatus for implementing the method of the invention, comprising means for implementing the method of the invention. An embodiment of the apparatus of the invention is illustrated in FIG. 3. The dotted line illustrates optional units. The apparatus may include further optional units not shown in the figure.

In an embodiment, the means comprises
   a meat grinder for grinding a gutted, plucked poultry meat material to provide a ground poultry mass,
   an extruder connected with the meat grinder and configured to receive the ground poultry mass to provide an extruded mass,
   optionally a colloid mill connected with the extruder and configured to receive the extruded mass to provide a food product.

The following examples are presented for further illustration of the invention without limiting the invention thereto.

The calcium content of the food product was measured according to standard SFS-EN ISO 11885, 2009.

The level of aerobic microorganisms was measured according to standard NMKL 86:2013.

The amount of *Salmonella* was measured according to ISO/DIS 20976-2.

Example 1

58 kg of poultry carcass (with bones and skin) was minced with a meat grinder with a hole size of 2 mm. The ground poultry mass was then properly mixed with 42 kg of a mixture consisting of 21 kg of a soy concentrate powder (protein content of 66 wt. %) and 21 kg of a pea concentrate powder (protein content of 79 wt. %). The mixture was kept at approximately 4° C. The mixture was fed to a meat grinder with a hole size of 5 mm. The resultant ground mixture was then cooled to approximately 2° C. and cut to pellets with a length of approximately 5 mm. The pellets kept cooled were fed to an extruder as a constant feeding process using air pressure bursts to avoid stops in the feeding.

The extrusion process was performed with a twin-screw extruder with a temperature profile of a cylinder (from feeder to cooling die): 65-70-80-100-120-140-150° C., and the cooling die with temperature of 25° C. The extrusion was performed using approximately 400 rpm speed to provide an extruded mass. The extruded mass showed a temperature of about 35° C. at the exit.

The extruded mass was collected and cooled to +4° C. whereby a ready-to-eat food product was obtained. The food product had a calcium content of 0.52 wt-%.

The level of aerobic microorganisms measured at 30° C./72 h was <1000 pmy/g. The measured level of aerobic microorganisms indicates that a food grade product for human consumption was obtained.

The extruded mass of +4° C. was torn to approximately 1-5 mm particle size. The particles were marinated with a mixture of rapeseed oil and spice at +4° C. for approximately 2 hours. The marinated particles were cooled and formed to a patty by adding egg, spices, wheat flour and dried vegetable particles. The patty was cooked in rapeseed oil, cooled to 2° C., packed in vacuum package. The resultant food product exhibited an appealing taste and mouthfeel.

A similar cooked product may be produced from an extruded mass which is frozen to below −18° C. The frozen extruded mass is first torn to smaller particles and then marinated and cooked as described above.

Example 2

Extruded mass was produced in a similar manner as in Example 1 from poultry carcass and a soy protein concentrate. The extruded mass was collected and frozen to −20° C.

The extruded mass of −20° C. was thawed to about +4° C. The thawed extruded mass was torn to particles of about 1-5 mm particle size. Fresh grounded chicken meat was added to the particles in a ratio of 65:35 w/w. Beef fat was added to the obtained mixture in a ratio of 1:10 w/w followed by grinding by a meat grinder with 5 mm sieve to provide a dough.

2.0 wt-% of salt and spices including black pepper powder, hot pepper powder, cumin powder, garlic powder, onion powder and cayenne pepper were added to the dough. The dough was kneaded for about 20 minutes until a smooth mass was obtained. The mass was wrapped in an oil-coated aluminum foil, baked in an oven at 125° C. until the internal temperature of the kebab-like mass was 80° C.

Product was cooled to +4° C. and vacuum packaged.

The resultant kebab-like food product exhibited an appealing taste and mouthfeel.

Example 3

70 kg of poultry carcass (with bones and skin) was minced with a meat grinder with a hole size of 2 mm. The ground poultry mass was then colloid milled to a fine mass with bone particles with approximately diameter of 100 μm. Milled mass was properly mixed with 30 kg of a soy concentrate powder (protein content of 66 wt. %). The resultant mixture was kept at approximately 4° C. The mixture was then loaded to a silo connected to a conveyor screw that was connected to a hopper with approximately 30 liters of volume. The mixture was led from the hopper with an auger and a screw to an extruder in a controlled manner at approximately 55 kg/h.

The mixture of ground poultry mass and a soy concentrate powder was led to an extruder which had a cooling die integrated therewith. The moisture content of the mixture was about 55 wt-%. The mixture was extruded at 170 rpm. Heating zones of the extruder were adjusted to a temperature of 60° C., 70° C., 80° C., 100° C., 120° C., 150° C. and 170° C. First zone of the cooling die was set to 60° C. and last zone to 40° C. The extrusion process took about one minute.

The extruded mass exited the cooling die at a temperature of less than 100° C. Only small amount of steam was released in the process. Solid mass and some amounts of separated oil exited the end of the cooling die.

The level of aerobic microorganisms of the solid mass obtained from the wet extrusion and that of the mixture of ground poultry mass and a soy concentrate powder to be fed to the wet extrusion, i.e., "raw material") were measured at 30° C./72 h. The solid mass showed <100 pmy/g, while the raw material showed more than 30 000 000 pmy/g. The measured level of aerobic microorganisms indicates that a food grade product for human consumption was obtained.

The food product, i.e., solid mass, had a calcium content of 0.52 wt-%.

The solid mass exhibited 7-log reduction of *Salmonella* bacteria indicating that *Salmonella* was completely eliminated.

The solid mass was ground with a meat grinder having a hole size of 2 mm. Sunflower oil and water were both added to the ground mass each in a ratio of 2:10 (w/w) and were left to be absorbed by the mass at 4° C. for 60 minutes. Batches of the mass were then milled with a colloid mill. The colloid milling provides a mass which is a ready-to-consume food product.

The mass may also be used as an ingredient of a food composition in an amount up to 50 wt-% of the total weight of the food composition.

Example 4

The extruded mass was produced as described in Example 3. The extruded mass was torn to particles having a particle size of about 1-5 mm. Fresh ground chicken meat was added to the particles in a ratio of 65:35 (w/w). Beef fat was added to the obtained mixture in a ratio of 1:10 (w/w) followed by grinding by a meat grinder with a 5 mm sieve to provide a dough.

2.0 wt-% of salt and spices including black pepper powder, hot pepper powder, cumin powder, garlic powder, onion powder and cayenne pepper were added to the dough. The dough was kneaded for about 20 minutes until a smooth mass was obtained. The mass was wrapped in an oil-coated aluminum foil, baked in an oven at 125° C. until the internal temperature of the kebab-like mass was 80° C.

Product was cooled to +4° C. and vacuum packaged.

The resultant kebab-like food product exhibited an appealing taste and mouthfeel.

Example 5

93 kg of poultry carcass (with bones and skin) was minced with a meat grinder with a hole size of 2 mm. The ground poultry mass was then colloid milled to a fine mass with bone particles with approximately diameter of 100 μm. Milled mass was properly mixed with 7 kg of a soy concentrate powder (protein content of 66 wt. %). The resultant mixture was kept at approximately 4° C. The mixture was then loaded to a silo connected to a conveyor screw that was connected to a hopper with approximately 30 liters of volume. The mixture was led from the hopper with an auger and a screw to an extruder in a controlled manner at approximately 55 kg/h.

The mixture of ground poultry mass and a soy concentrate powder was led to an extruder which had a cooling die integrated therewith. The moisture content of the mixture was about 65 wt-%. The mixture was extruded at 170 rpm. Heating zones of the extruder were adjusted to a temperature of 60° C., 70° C., 80° C., 100° C., 120° C., 150° C. and 170° C. First zone of the cooling die was set to 60° C. and last zone to 40° C. The extrusion process took about one minute.

The extruded mass exited the cooling die at a temperature of less than 100° C. Only small amount of steam was released in the process. Solid mass and some amounts of separated oil exited the end of the cooling die.

The level of aerobic microorganisms of the solid mass obtained from the wet extrusion and that of the mixture of ground poultry mass and a soy concentrate powder to be fed to the wet extrusion, i.e., "raw material") were measured at 30° C./72 h. The solid mass showed <100 pmy/g, while the raw material showed more than 30 000 000 pmy/g. The measured level of aerobic microorganisms indicates that a food grade product for human consumption was obtained.

The food product, i.e., solid mass, had a calcium content of 1.2 wt-%.

The solid mass exhibited 7-log reduction of *Salmonella* bacteria indicating that *Salmonella* was completely eliminated.

The solid mass was ground with a meat grinder having a hole size of 2 mm. Sunflower oil and water were both added to the ground mass each in a ratio of 2:10 (w/w) and were left to be absorbed by the mass at 4° C. for 60 minutes. Batches of the mass were then milled with a colloid mill. The colloid milling provides a mass which is a ready-to-consume food product.

The mass may also be used as an ingredient of a food composition in an amount up to 50 wt-% of the total weight of the food composition.

It will be obvious to a person skilled in the art that, as the technology advances, the inventive concept can be implemented in various ways. The invention and its embodiments are not limited to the examples described above but may vary within the scope of the claims.

The invention claimed is:

1. A method of producing a food product, the method comprising
   providing gutted and plucked poultry meat material comprising one or more of bones, tissues, tendons, skin, and cartilages,
   providing a plant-based food material,
   grinding the gutted and plucked poultry meat material with a grinder having a hole size of at most 5 mm to provide ground poultry mass,
   adding the plant-based food material to the ground poultry mass to provide a mixture of the ground poultry mass and the plant-based food material,
   subjecting the mixture to an extrusion to provide an extruded mass as a food product,
   wherein the food product contains about 25 wt-% to about 95 wt-% of the gutted and plucked poultry meat material and about 5 wt-% to about 75 wt-% of the plant-based food material, and
   wherein the food product has a calcium content of about 0.2 wt-% to about 0.7 wt-%.

2. The method of claim 1, wherein the gutted and plucked poultry meat material comprises the bones.

3. The method of claim 1, wherein the gutted and plucked poultry meat material contains the bones in an amount of about 10 wt-% to about 60 wt-% based on weight of the gutted and plucked poultry meat material.

4. The method of claim 1, wherein the plant-based food material comprises a protein selected from the group consisting of soy protein, pea protein, cereal proteins, broad bean protein, maize protein, and mixtures thereof.

5. The method of claim 1, wherein the plant-based food material is added so that the food product contains about 5 wt-% to about 50 wt-% of the plant-based food material.

6. The method of claim 1, wherein the food product contains about 50 wt-% to about 95 wt-% of the gutted and plucked poultry meat material.

7. The method of claim 1, wherein the extrusion is performed at a temperature of 100° C. to about 400° C.

8. The method of claim 1, wherein the extrusion is performed at a moisture content of at least 20 wt-%.

9. The method of claim 1, wherein the extrusion is a wet extrusion in which the mixture of the ground poultry mass and the plant-based food material has a moisture content of about 30 wt-% to about 70 wt-%.

10. The method of claim 1, wherein a temperature of the extruded mass is at least 100° C.

11. The method of claim 1, wherein the extruded mass is cooled to a temperature of about +60° C. to about −40° C.

12. The method of claim 1, further comprising mincing of the extruded mass with a colloid mill.

13. The method of claim 1, wherein the food product has a calcium content of about 0.2 wt-% to about 0.5 wt-%.

* * * * *